United States Patent [19]

Miyaji et al.

[11] Patent Number: 5,317,225
[45] Date of Patent: May 31, 1994

[54] SPINDLE MOTOR AND DISK CLAMP MECHANISM USED THEREIN

[75] Inventors: Itsuo Miyaji, Yokaichi; Hiroyuki Yonei, Hikone, both of Japan

[73] Assignee: Nippon Densan Corporation, Kyoto, Japan

[21] Appl. No.: 808,103

[22] Filed: Dec. 13, 1991

[30] Foreign Application Priority Data

Dec. 29, 1990 [JP] Japan .................................. 2-416183
Dec. 29, 1990 [JP] Japan .................................. 2-416184
Dec. 31, 1990 [JP] Japan .................................. 2-418826

[51] Int. Cl.⁵ ..................... H02K 7/14; G11B 17/08; G11B 5/016
[52] U.S. Cl. ..................... 310/67 R; 360/98.08; 360/99.05
[58] Field of Search ............ 310/67 R, 191, 156; 360/98.02, 98.07, 98.08, 99.04, 99.05, 99.08, 99.12

[56] References Cited

U.S. PATENT DOCUMENTS

| | | | |
|---|---|---|---|
| 4,658,312 | 4/1987 | Elsässer et al. | 310/156 |
| 4,683,505 | 7/1987 | Schmidt et al. | 360/98.08 |
| 4,701,653 | 10/1987 | Merkle et al. | 360/99.08 |
| 4,779,165 | 10/1988 | Elsaesser et al. | 310/156 |
| 4,870,703 | 9/1989 | Augeri et al. | 360/98.07 |
| 4,910,620 | 3/1990 | Olbrich | 360/99.12 |
| 4,968,910 | 11/1990 | Meier et al. | 310/90 |
| 5,059,844 | 10/1991 | Austine | 310/90 |
| 5,089,922 | 2/1992 | LeClair | 360/99.12 |

*Primary Examiner*—Steven L. Stephan
*Assistant Examiner*—C. LaBalle
*Attorney, Agent, or Firm*—McCormick, Paulding & Huber

[57] ABSTRACT

A spindle motor comprising a bracket, a hub which is rotational relative to the bracket, and bearing means disposed between the bracket and the hub, wherein the hub has a hub main body made of aluminum or an aluminum alloy, and a holder formed from a magnetic material, and wherein a rotor magnet is mounted on the inner surface of the holder. A ring-shaped recess is provided on the inner surface of the bracket, and the hub and a part of the rotor magnet extend into the ring-shaped recess. Improvements having been made on a disk clamp mechanism for mounting a recording disk on the hub of the spindle motor.

4 Claims, 4 Drawing Sheets

SPINDLE MOTOR AND DISK CLAMP MECHANISM USED THEREIN

BACKGROUND OF THE INVENTION

1. Field of the Invention

The present invention relates to a spindle motor for rotating recording disks and to a disk clamp mechanism used in the spindle motor.

2. Description of the Related Art

Spindle motors comprise a bracket mounted on a frame of a driving apparatus, a hub which is rotational relative to the bracket, and bearing means disposed between the bracket and the hub. A rotor magnet is mounted on the inner surface of the hub, and a stator is disposed facing the rotor magnet. Recording members, such as magnetic disks, are mounted on the hub.

In the spindle motor of the prior art, the entire hub is formed of an aluminum or iron material, which is the cause of the following problems. When a hub is formed of, for example, an aluminum material, a magnetic material (e.g., yoke member) must be disposed between the rotor magnet and the hub in order to prevent magnetic fluxes from leaking from the magnetic circuit to the motor. It is therefore difficult to miniaturize the motor. When the hub member is formed of an iron material, machining it is difficult, particularly machining the surface on which recording disks are placed.

This type of spindle motor has the drawbacks described below. One of the ends of the rotor magnet is positioned in the upper section of the inner surface of the bracket. The height of the components including the rotor magnet and the bracket is slightly greater than the sum of the height of both the rotor magnet and the bracket (that is, greater by at least as much as the gap between them). Therefore, the over-all height of the motor becomes greater, thereby making it difficult to make the motor thinner. To make a motor thinner, such things as making the thickness of the bracket thinner, or making the height of the rotor magnet less, can be considered. However, when the bracket is made thinner, its strength is decreased; hence a new problem, such as vibrations, arises. When the height of the rotor magnet is reduced, a problem arises in that the torque of the motor is decreased. To prevent the vibration of the motor, the magnetic center of the stator has to be substantially matched with that of the rotor magnet. In the prior art, the magnetic center is adjusted by regulating the number of pieces of core plates. Therefore, it is difficult to accurately make the magnetic centers coincide with each other. Depending upon the construction of the motor, it is fairly difficult to make the magnetic centers of the stator and the rotor magnet coincide.

A clamp mechanism used in this type of spindle motor includes a disk placement surface provided on a hub, and a clamp member mounted on this hub. A flat placement surface is provided on the hub, and a flat pressing surface is provided in the clamp member in correspondence with the placement surface. However, it is difficult to machine the placement surface and the pressing surface flat and with a high degree of accuracy. Therefore, it is difficult to support recording disks in such a manner that the surfaces thereof are substantially perpendicular to the axis of the rotation center of the hub. In particular, when there is only one recording disk, it is likely to change its shape according to the shapes of the placement and pressing surfaces. A problem arises when the recording disks are clamped, they change their shape if the placement surface and/or the pressing surface is not fairly flat.

SUMMARY OF THE INVENTION

An object of the present invention is to provide a spindle motor which can be machined and miniaturized relatively easily.

Another object of the present invention is to provide a spindle motor in which the total height of the spindle motor can be reduced without compromising the torque.

A further object of the present invention is to provide a spindle motor which is capable of substantially matching the magnetic centers of a stator and a rotor magnet fairly easily.

A still further object of the present invention is to provide a spindle motor which can be held on a frame of a driving apparatus stably and reliably.

A still further object of the present invention is to provide a clamp mechanism which is capable of reliably holding recording disks on surfaces which are substantially perpendicular to the axis of the rotation center of the hub.

A still further object of the present invention is to provide a clamp mechanism with a simple construction which is capable of reliably and easily mounting recording disks on a hub.

The aforementioned and other objects, features and advantages of the present invention will become clear when reference is made to the following description of the referred embodiments of the present invention, together with reference to the accompanying drawings.

DETAILED DESCRIPTION OF THE PREFERRED EMBODIMENTS

Preferred embodiments of the present invention will be explained below with reference to the accompanying drawings.

A First Embodiment of a Spindle Motor

Figure 1:
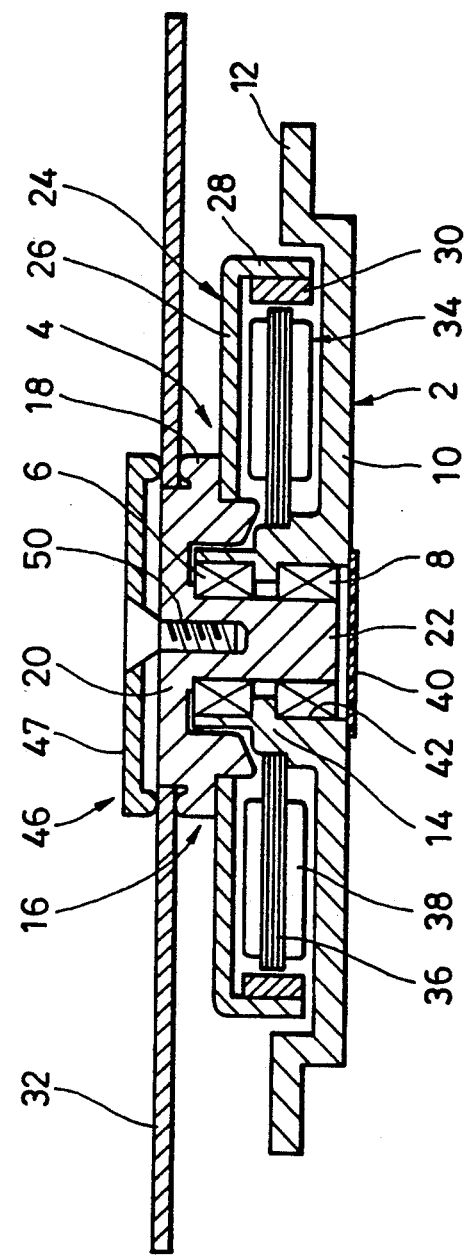
FIG. 1 is a cross-sectional view which illustrates a first embodiment of a spindle motor of the present invention.
Figure 2:
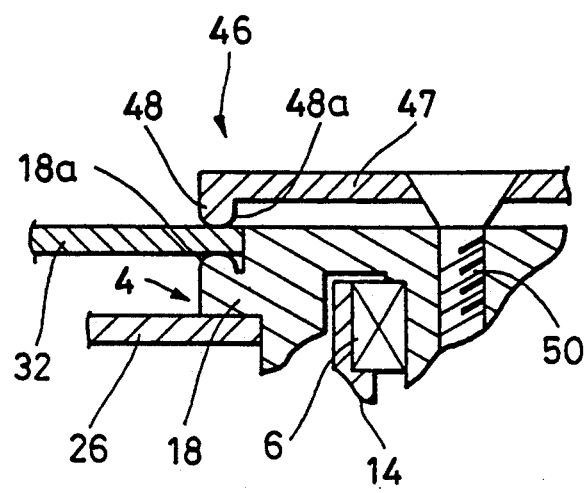
FIG. 2 is a partially enlarged sectional view which illustrates a clamp mechanism used in the spindle motor of FIG. 1; and the vicinity of the clamp mechanism.

FIGS. 1 and 2 show a first embodiment of a spindle motor of the present invention.

The spindle motor shown in FIG. 1 comprises a bracket 2 and a hub 4 rotatable relative to the bracket 2. A pair of bearing members 6 and 8 are disposed between the bracket 2 and the hub 4. The bracket 2 has a bracket main body 10 substantially in the shape of a circle. A flange 12 is integrally formed on the periphery of the bracket main body 10. The flange 12 is mounted on a frame (not shown) of a driving apparatus by using, for example, mounting screws. A cylindrical wall 14 projecting upwardly in FIG. 1 is disposed in the central section of the bracket main body 10. The hub 4 is rotatably supported on the cylindrical wall 14 via the pair of bearing members 6 and 8.

The hub 4 has a substantially cylindrical hub main body 16. A flange 18 projecting radially and outwardly is integrally disposed axially in the central section of the hub main body 16. The top surface of the flange 18 functions as a disk placement surface 18a. An end wall section 20 is integrally disposed in one of the end sections (the top end section) of the hub main body 16. A shaft 22 extending downwardly is formed in the central section of the end wall section 20 and a female screw hole extending into the shaft 22 across the end wall section 20 is formed. The other end of the hub main body 16 extends downwardly along the outer surface of the cylindrical wall 14 of the bracket main body 10. The shaft 22 of the hub main body 16 extends outwardly across the other end wall section. The shaft 22 extending from the inner surface of the end wall section 20 is supported by the bearing members 6 and 8 placed at predetermined intervals. A magnetic disk 32 serving as a recording disk is placed on the placement surface 18a of the hub main body 16. The hub main body 16 should preferably be formed of aluminum or aluminum alloys. With such a composition, it is easy to machine the placement surface 18a, the outer surface of the shaft 22 extending from the end wall section 20, the outer surface (facing the inner surface of the magnetic disk 32) of the one end section of the hub main body 16, and the like.

The hub 4 further comprises a cup-shaped holder 24. The holder 24 has a disk-shaped base 26 and a ring-shaped vertical section 28 extending downwardly from the outer circumference of the base 26. The inner surface of the base 26 is fixed to the other end section of the hub main body 16 by a means, such as press-fitting. A rotor magnet 30 is mounted on the inner surface of the vertical section 28. The holder 24 should preferably be formed of a magnetic material like iron. With such a composition, leakage of magnetic fluxes from a magnetic circuit made up of the rotor magnet 30 and a stator 34 can be effectively prevented without disposing magnetic-flux leakage preventing members, such as yoke members. Furthermore, since yoke members are unnecessary, space for the magnetic circuit can be made larger and the motor can be miniaturized.

The stator 34 is disposed facing the rotor magnet 30. The stator 34 has a stator core 36 formed by laminating a plurality (e.g., three) of plates and a coil 38 wound around the stator core 36. The stator core 36 is fixed to the outer surface of the cylindrical wall 14 of the bracket main body 10. A seal 40 is adhered to the exterior of the bracket main body 10. As a result, a bearing mounting hole 42 formed on the cylindrical wall 14 is hermetically sealed.

In such a spindle motor, the diameter of the magnetic disk 32 is 42 to 50 mm. To stably and reliably support the spindle motor on a frame (not shown) of a driving apparatus in a state in which a magnetic disk 32 of this size is installed, the outer diameter (in the embodiment, the outer diameter of the flange 12) of the bracket 2 should preferably be set in such a manner that it becomes substantially equal to the outer diameter of the magnetic disk 32. When a magnetic disk 32 is used, the diameter thereof should preferably be 40 to 52 mm.

In a spindle motor constructed as described above, when a predetermined current is supplied to the coil 38, the rotor magnet 30 (the hub 4 which is integral with this magnet and the magnetic disk 32) is rotated in a predetermined direction with respect to the stator 34 (the bracket 2 which is integral with this stator).

Next, an explanation will be given about a clamp mechanism in accordance with the present invention, for clamping the magnetic disk 32. Referring mainly to FIG. 2, a clamp mechanism 46 has a pressing member 47 in the shape of a plate. A ring-shaped projection 48 projecting downwardly in FIGS. 1 and 2 is integrally disposed on the outer circumference of the pressing member 47. The bottom surface (the surface facing the placement surface 18a) of the projection 48 functions as a pressing surface 48a which acts to press the magnetic disk 32. The bottom surface of the pressing surface 48a extends downwardly in the shape of a circular arc in its cross section, and the radius thereof is preferably approximately 10 to 30 mm. In relation to the above composition, the clamp mechanism is further constructed as described below. The placement surface 18a of the hub 4, on which the magnetic disk 32 is received, is arranged at one of the ends (the upper end section) of the hub main body 16, and the top surface projects outwardly in the shape of a circular disk in its cross section. The shape of the placement surface 18a may be substantially the same as that of the pressing surface 48a, and the radius thereof may be 10 to 30 mm. A hole is formed in the central section of the projection 48, through which a fixation screw 50 is screwed into the female screw hole of the hub main body 16, and thus the pressing member 47 is mounted on the hub 4. The diameter of the front end section (the section in contact with the magnetic disk 32) of the placement surface 18a and that of the front end section (the section in contact with the magnetic disk 32) of the pressing surface 48a are set substantially equal to each other. The front end sections of the placement surface 18a and the pressing surface 48a are pressed against each other via the magnetic disk 32. As a result, the magnetic disk 32 is held in a fastened state between the placement surface 18a and the pressing surface 48a. In this way, the magnetic disk 32 is reliably supported in such a way that it forms a flat surface substantially perpendicular to the axial line of the center of rotation of the hub 4. Such a holding method as described above is of great convenience for reliably supporting one disk of the magnetic disks 32 having a diameter of approximately 40 to 50 mm or slightly greater, approximately 58 to 70 mm, in other words, approximately 40 to 70 mm.

Figure 3:
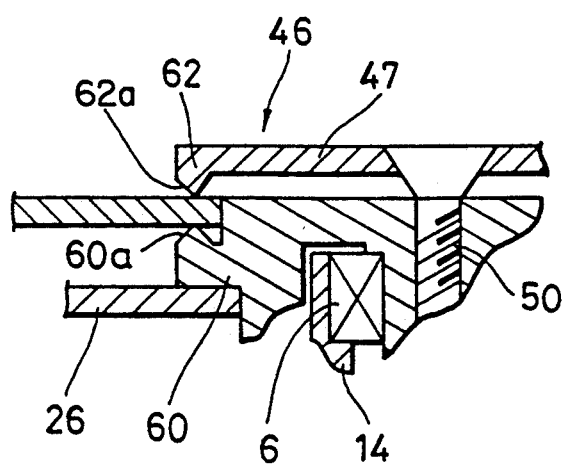
FIG. 3 is a partially enlarged sectional view in which that part of the spindle motor equipped with a clamp mechanism of a first modification is enlarged.
Figure 4:
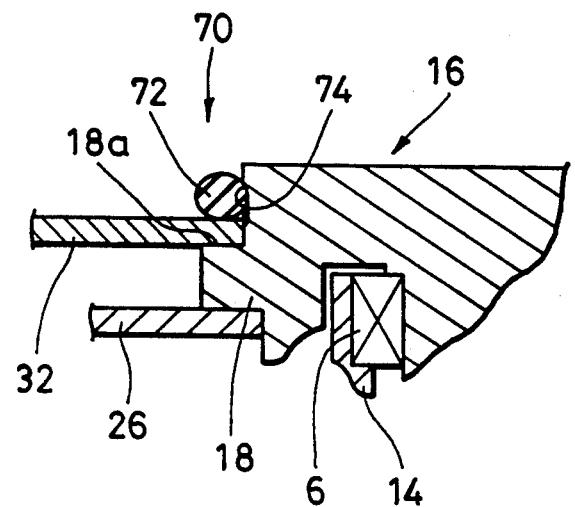
FIG. 4 is a partially enlarged sectional view in which that part of the spindle motor equipped with a clamp mechanism of a second modification is enlarged.

Although in FIG. 2, the placement surface 18a and the pressing surface 48a project in the form of a circular arc, they may project in the form of, for example, an ellipse instead. Or, they may be constructed as shown in FIG. 3 or 4. Those parts in FIGS. 3 and 4 which are substantially the same as those parts in FIGS. 1 and 2 are given the same reference numerals, and an explanation will be given.

In a clamp mechanism of a first modification shown in FIG. 3, a placement surface 60a and a pressing surface 62a are substantially in the form of a triangle in its cross section. A ring-shaped projection 62 extending downwardly is integrally disposed on the outer circumference of the pressing member 47, and the bottom surface of the projection 62 functions as the pressing surface 62a. The bottom surface of the pressing surface 62a projects downwardly in the form of a triangle in its cross section, and the vertical angle thereof may be approximately 70 to 140 degrees. The placement surface 60a of the hub 4 is placed in one of the end sections (the top end section) of the hub main body 16, and the top surface thereof projects upwardly in the form of a triangle in its cross section. The shape of the placement surface 60a may be substantially the same as that of the above-mentioned pressing surface 62a, and the vertical angle thereof may be approximately 70 to 140 degrees. The projection member 48 is mounted on the hub 4 by screwing the fixation screw 50 into the female screw hole of the hub main body 16. The diameter of the top section (the part in contact with the magnetic disk 32) of the placement surface 18a is set substantially the same as that of the top section (the part in contact with the magnetic disk 32) of the pressing surface 48a. Accordingly, the top sections of the placement surface 18a and the pressing surface 48a are pressed against each other via the magnetic disk 32. As a result, the magnetic disk 32 is held in a fastened state between the placement surface 18a and the pressing surface 48a in a state in which the pressing member 47 is mounted. In such a mounted state, the magnetic disk 32 is reliably supported so as to form a flat surface substantially perpendicular to the axial line of the center of rotation of the hub 4. Thus, one of the magnetic disks 32 can be reliably supported in the same manner as the embodiment in FIGS. 1 and 2.

FIG. 4 shows a second modification of the clamp mechanism. A clamp mechanism 70 in FIG. 4 has an elastic ring 72 employed as a clamp means. The elastic ring 72 is circular in its cross section, and the outer diameter thereof is substantially the same over the entire circumference. As can be understood from FIG. 4, the outer diameter of the elastic ring is set substantially equal to or slightly greater than that of a ring-shaped recess 74 of the hub main body 16. The elastic ring 72 can be formed from, for example, synthetic rubber.

The ring-shaped recess 74 in the shape of a semi-circle in its cross section is formed on the outer surface of one of the end sections (the upper end section) of the hub main body 16. The flange 18 is integrally disposed on the other end section of the hub main body 16. The top surface of the flange 18 functions as the disk placement surface 18a. The disk placement surface 18a is substantially perpendicular to the axial line of the center of rotation of the hub 4 and extends substantially flatly. The distance from the placement surface 18a to the lower edge of the ring-shaped recess 74 is set slightly smaller than the thickness of the magnetic disk 32. Therefore, when the magnetic disk 32 is placed on the placement surface 18a, the upper end section of the magnetic disk 32 is positioned slightly above the lower edge of the ring-shaped recess 74. As a consequence, when the elastic ring 72 is mounted, this ring acts on the magnetic disk 32 elastically.

In such a clamp mechanism 70, concerning the mounting of the magnetic disk 32, the disk-shaped recording disk 32 is placed on the placement surface 18a of the hub 4, and thereafter the elastic ring 72 is preferably mounted in the ring-shaped recess 74 of the hub 4. The magnetic disk 32 can be mounted on the hub 4 easily by a simple operation. In such a mounted state, the elastic ring 72 acts on the inner edge of the magnetic disk 32 elastically. As a result, the magnetic disk 32 is reliably held, as required, between the placement surface 18a of the hub 4 and the elastic ring 72.

The clamp mechanism as described above can be conveniently used to support one recording disk 32 having a diameter of approximately 40 to 50 mm or slightly greater, approximately 58 to 70 mm, in other words, approximately 40 to 70 mm. The clamp mechanism is not suited for mounting a comparatively large recording disk 32 or a plurality of recording disks.

An explanation is given applying the present invention to shaft rotary type spindle motors, for example, in the specific examples shown in the figures. However, the present invention is not limited to such cases. It can also be applied to shaft fixed type spindle motors which are well known in themselves.

A Second Embodiment of a Spindle Motor

Figure 5:
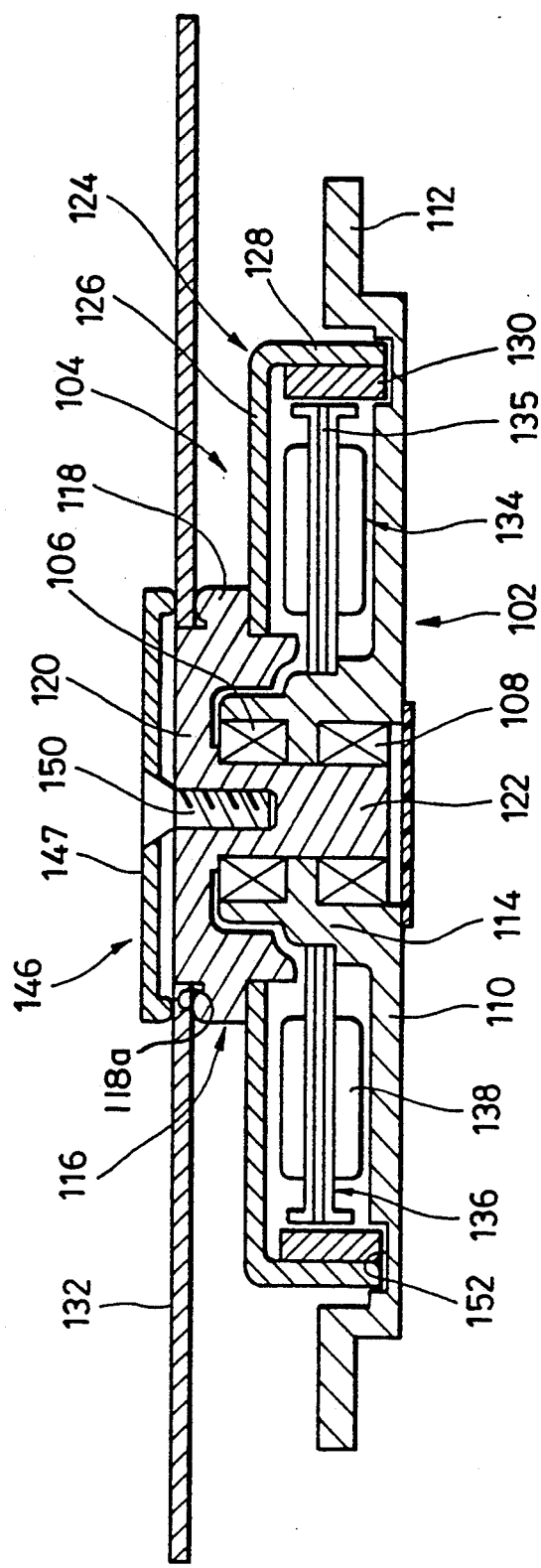
FIG. 5 is a cross-sectional view which illustrates a second embodiment of the spindle motor of the present invention.

In FIG. 5, the spindle motor comprises a bracket 102 and a hub 104 rotatable relative to the bracket 102. A pair of bearing members 106 and 108 are disposed between the bracket 102 and the hub 104. The bracket 102 has a bracket main body 110 substantially in the shape of a circle. A flange 112 is integrally formed on the periphery of the bracket main body 110. The flange 112 is mounted on a frame (not shown) of a driving apparatus by using, for example, mounting screws. A cylindrical wall 114 projecting upwardly in FIG. 5 is disposed in the central section of the bracket main body 110. The hub 104 is rotatably supported on the cylindrical wall 114 via the pair of bearing members 106 and 108.

The hub 104 has a substantially cylindrical hub main body 116. A flange 118 projecting radially and outwardly is integrally and axially disposed in the central section of the hub main body 116. A disk placement surface 118a is provided on the top surface of the flange 118. A shaft 122 extending downwardly is integrally formed on the inner surface of the central section of an end wall section 120 of the hub main body 116. The shaft 122 is supported on the bearing members 106 and 108 arranged at predetermined intervals. The hub main body 116 should preferably be formed of aluminum or an aluminum alloy.

The hub 104 further comprises a cup-shaped holder 124. The holder 124 has a disk-shaped base 126 and a ring-shaped vertical section 128 extending downwardly from the base 126. The base 126 is fixed to the other end section of the hub main body 116 by a means, such as press-fitting. A rotor magnet 130 is mounted on the inner surface of the vertical section 128. The holder 124 should preferably be formed of a magnetic material like iron.

A stator 134 is disposed facing the rotor magnet 130. The stator 134 has a stator core 136 formed by laminating a plurality (e.g., three) of core plates 135 and a coil 138 wound around the stator core 136. The stator core 136 is fixed to the outer surface of the cylindrical wall 114 of the bracket main body 110.

A recording disk 132, such as a magnetic disk, is mounted on the hub 104 by a clamp mechanism 146. The clamp mechanism 146 may be the one disclosed in the first embodiment.

Figure 6:
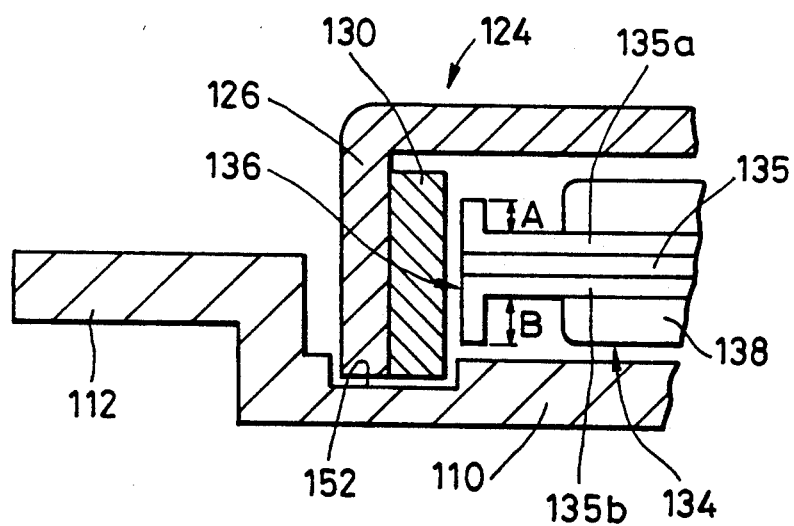
FIG. 6 is a partially enlarged sectional view in which a part of the spindle motor of FIG. 5 is enlarged.

The spindle motor shown in FIG. 5 is constructed as described below to make the motor thinner. Referring to FIGS. 5 and 6, a ring-shaped recess 152 is formed on the inner surface (the top surface in FIG. 5) of the bracket main body 110. On the other hand, the lower end of the vertical section 128 of the holder 124 and the lower end of the rotor magnet 130 substantially coincide, which coinciding defines the same plane. The lower end of the vertical section 128 and that of the rotor magnet 130 extend into the ring-shaped recess 152. A labyrinth seal construction is constituted by the lower end sections of the vertical section 128 and the rotor magnet 130, and the ring-shaped recess 152 of the bracket main body 110 (in relation to this, the cross section of the ring-shaped recess 152 is rectangular).

As a result, since the lower end sections of the holder 124 and the rotor magnet 130 are positioned inside the ring-shaped recess 152 of the bracket main body 110, the total height of the motor can be reduced by an amount equal to the extent that these lower end sections overlap the bracket main body 110 in the vertical direction, and a higher torque and miniaturization of a motor, which have been demanded in recent years, can be achieved. Since a labyrinth seal construction is constituted by the lower end sections of the vertical section 128 and the rotor magnet 130, in addition to the motor being made thinner, entry of impurities, such as grease, from the bearing members 106 and 108 into a housing in which the magnetic disk 132 is housed can be effectively prevented.

To suppress vibrations of the motor, the spindle motor is further constructed as described below. The front end section of a topmost core plate 135a of a plurality of core plates 135 is bent to the outside (the upper section in FIGS. 5 and 6), and the front end section of a bottommost core plate 135b is bent to the inside (the lower section in FIGS. 5 and 6). To prevent vibrations caused by the magnetic circuit and increase the efficiency of the circuit, an end section of the rotor magnet 130, as shown in FIG. 6, should preferably be projected slightly to the outside across the topmost core plate 135a (in a case where the front end section is bent, across the bent front end), and the other front end section of the rotor magnet 130 should preferably be projected slightly to the outside through the bottommost core plate 135b (in a case where the front end section is bent, across the bent front end section). However, when a part of the rotor magnet 130 is positioned inside the ring-shaped recess 152 of the bracket main body 110 as shown, it is difficult to substantially match the magnetic center of the rotor magnet 130 with that of the stator 134. To eliminate such a problem, in this embodiment, the bending length A of the topmost core plate 135a is made different from the bending length B of the bottommost core plate 135b. The bending length B is made longer than the bending length A in order that the above-mentioned magnetic centers can be substantially matched with each other.

In accordance with the above, the magnetic centers of the rotor magnet 130 and the stator 134 can be matched easily with each other by a simple construction in which the front end sections of the topmost core plate 135a and the bottommost core plate 135b are bent. As a result, vibrations from the magnetic circuit can be effectively prevented. Such a construction can be widely used in various types of motors and is particularly advantageous for small motors. Furthermore, the magnetic centers can be adjusted substantially irrespective of the thickness of the core plate 135, which adjustment is an especially effective means for, for example, motors in which the rotor magnet 130 and the stator 134 are arranged in an offset manner.

The spindle motor as described above can be suitably used to rotate the recording disk 132 having a diameter of approximately 40 to 70 mm.

Many different embodiments of the present invention may be constructed without departing from the spirit and scope of the present invention. It should be understood that the present invention is not limited to the specific embodiments described in this specification, and is only limited by the appended claims.

What is claimed is:

1. A disk clamp mechanism, comprising:
a disk placement surface defined by a hub on which a recording disk is mounted; and clamp means for clamping the recording disk place on the disk placement surface, wherein the disk placement surface of the hub is substantially flat, a ring shaped recess, the cross section of which is substantially in the shape of semi-circle, is provided above the disk placement surface of the hub, the distance from the placement surface to the lower edge of the recess is set slightly smaller than the thickness of the recording disk, the clamp means is formed from an elastic ring, the cross section of the elastic ring is circular, and one recording disk is elastically held between the disk placement surface and the elastic ring by mounting the elastic ring in the recess.

2. A disk clamp mechanism according to claim 1, wherein the outer diameter of the elastic ring is substantially equal to or slightly greater than that of the ring-shaped recess.

3. A disk clamp mechanism according to claim 1, wherein the diameter of the recording disk is 40 to 70 mm.

4. A spindle motor, comprising:
a bracket including an inner surface providing a first ring-shaped recess;
a stator mounted on the bracket;
a hub rotatable relative to the bracket and on which a recording disk is mounted, the hub including a main body made of aluminum or an aluminum alloy, the main body including a top surface outwardly projecting in the shape of a circular disk from a side surface of the main body, the top surface providing a substantially flat disk placement surface, and the side surface providing a second ring-shaped recess having a substantially semi-circular cross-section;
an elastic ring mounted in the second ring-shaped recess for holding the recording disk to be interposed between the second ring-shaped recess and the top surface of the main body of the hub;
bearing means disposed between the bracket and the hub;
a cup-shaped holder formed from a magnetic material, the holder being mounted on a bottom end section of the main body of the hub;
a rotor magnet mounted on an inner surface of the holder; and
the holder and the rotor magnet having end sections extending into the first ring-shaped recess of the bracket in close proximity with walls provided by the first ring-shaped recess so that the first ring-shaped recess, the end sections of the holder, and the rotor magnet constitute a labyrinth seal construction.

* * * * *